(12) United States Patent
Tscherepanow et al.

(10) Patent No.: US 10,922,510 B2
(45) Date of Patent: Feb. 16, 2021

(54) METHOD, AUTOMATION SYSTEM AND COMPUTER SYSTEM FOR DETECTING OPTICAL CODES

(71) Applicant: BECKHOFF AUTOMATION GMBH, Verl (DE)

(72) Inventors: Marko Tscherepanow, Verl (DE); Robin Vogt, Verl (DE); Benjamin Jurke, Gütersloh (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 16/388,503

(22) Filed: Apr. 18, 2019

(65) Prior Publication Data
US 2019/0325183 A1   Oct. 24, 2019

(30) Foreign Application Priority Data
Apr. 19, 2018   (DE) .................. 10 2018 109 392

(51) Int. Cl.
| | | |
|---|---|---|
| *G06K 9/18* | (2006.01) | |
| *G06K 7/14* | (2006.01) | |
| *G06T 7/73* | (2017.01) | |
| *G06N 3/08* | (2006.01) | |

(52) U.S. Cl.
CPC .......... *G06K 7/1443* (2013.01); *G06K 7/1417* (2013.01); *G06K 7/1456* (2013.01); *G06N 3/08* (2013.01); *G06T 7/73* (2017.01)

(58) Field of Classification Search
CPC .............. G06K 7/1417; G06K 7/1491; G06K 19/06103

USPC ............... 235/462.09, 462.1, 462.15, 462.25
See application file for complete search history.

(56) References Cited

U.S. PATENT DOCUMENTS

| | | |
|---|---|---|
| 7,016,539 B1 | 3/2006 | Silver et al. |
| 7,181,066 B1 | 2/2007 | Wagman et al. |
| 8,523,075 B2 | 9/2013 | van der Merwe |
| 8,905,314 B2 | 12/2014 | van der Merwe et al. |
| 9,008,426 B2 | 4/2015 | Schuler et al. |
| 9,361,503 B2 | 6/2016 | Deppieri et al. |

(Continued)

FOREIGN PATENT DOCUMENTS

| | | |
|---|---|---|
| DE | 10137093 A1 | 2/2003 |
| EP | 3016028 A1 | 5/2016 |

OTHER PUBLICATIONS

Liu, S. J. et al.: Camera-based bar code recognition system using neural net. Proceedings of 1993 International Joint Conference on Neural Networks (IJCNN-93—Nagoya, Japan).

(Continued)

*Primary Examiner* — Daniel St Cyr
(74) *Attorney, Agent, or Firm* — Dorsey & Whitney LLP

(57) ABSTRACT

A method for detecting optical codes comprises an input image being provided. Optical codes in the input image are detected by generating an output image on the basis of the input image. Within generating the output image, pixels of an area of the input image comprising a part of an optical code are assigned a first intensity in the output image. Within generating the output image, pixels of an area of the input image e.g. comprising no part of an optical code are assigned a second intensity in the output image. Regions of the output image with the first intensity are provided for determining properties of the detected optical codes.

14 Claims, 8 Drawing Sheets

(56) References Cited

U.S. PATENT DOCUMENTS

| | | | |
|---|---|---|---|
| 9,396,377 | B2 | 7/2016 | van der Merwe et al. |
| 2004/0007623 | A1 | 1/2004 | Huang |
| 2008/0267464 | A1* | 10/2008 | Goda ................. H04N 1/00427 |
| | | | 382/124 |
| 2015/0339526 | A1 | 11/2015 | Macciola et al. |
| 2019/0303636 | A1* | 10/2019 | Olivastri ............ G06K 7/10821 |
| 2019/0325498 | A1* | 10/2019 | Clark .................. G06K 7/1417 |
| 2019/0332840 | A1* | 10/2019 | Sharma ............... G06K 7/1443 |

OTHER PUBLICATIONS

Champlin, C. et al.: AI Medicine Comes to Africa's Rural Clinics. IEEE Spectrum 54 (5), 42-48, 2017.

Fausett, L.: Fundamentals of Neural Networks—Architectures, Algorithms, and Applications. Prentice Hall, 1994.

Kim, J. et al.: Fast learning method for convolutional neural networks using extreme learning machine and its application to lane detection. Neural Networks, 87, 109-121, 2017.

Krizhevsky, A. et al.: ImageNet Classification with Deep Convolutional Neural Networks. Proceedings of the International Conference on Neural Information Processing Systems, 1097-1105, 2012.

Huang, G. B. et al.: Extreme Learning Machine: Theory and Applications. Neurocomputing, 70, 489-501, 2006.

Soille, P.: Morphological Image Analysis—Principles and Applications. Second Edition, Springer, 2003.

Tscherepanow, M. et al.: Automatic Segmentation of Unstained Living Cells in Bright-Field Microscope Images. Proceedings of the International Conference on Mass-Data Analysis of Images and Signals, 158-172, 2008.

Girshick, R. et al.: Rich Feature Hierarchies for Accurate Object Detection and Semantic Segmentation, Proceedings of the IEEE Conference on Computer Vision and Pattern Recognition, 580-587, 2014.

Hinton et al.: earning Representations by Recirculation. Proceedings of the International Conference on Neural Information Processing Systems, 358-366, 1988.

Anwar, S. et al.: Structured Pruning of Deep Convolutional Neural Networks. ACM Journal on Emerging Technologies in Computing Systems 13 (3), Artikel 32, 2017.

Schölkopf, B. et al.: Learning with Kernels. The MIT Press, 2002.

Gonzalez, R. C. et al.: Digital Image Processing. Pearson, 2017.

Blasinski, H. et al.: Per-Colorant-Channel Color Barcodes for Mobile Applications: An Interference Cancellation Framework. IEEE Transactions on Image Processing 22 (4), 1498-1511, 2013.

Long, J. et al.: Fully Convolutional Networks for Semantic Segmentation. Conference on Computer Vision and Pattern Recognition (CVPR), 2015.

Blaes, S. et al.: Few-shot learning in deep networks through global prototyping. Neural Networks 94, 159-172, 2017.

Feelders, A. J.: Chapter 2—Statistical Concepts, In: Intelligent Data Analysis. Editors: Berthold, M. & Hand, D. J., Springer-Verlag, 17-68, 2003.

Angerer, C.: Neuronale Netze, Revolution für die Wissenschaft? Spektrum der Wissenschaft, Jan. 2018.

Liu, H. et al.: Computational Methods of Feature Selection. Chapman & Hall/CRC, 109-110, Oct. 2007.

Berthold, M. et al.: Intelligent Data Analysis—An Introduction. Second Edition, Springer-Verlag, 101-110 & 202-207.

Marques de Sá: Pattern Recognition—Concepts, Methods and Applications; Springer-Verlag; pp. 1-8; 2001.

Goodfellow et al.: Deep Learning; The MIT Press; Chapter 1, pp. 1-27; 2016.

http://www.image-net.org/about-overview.

https://www.microsoft.com/en-us/research/project/high-capacity-color-barcodes-hccb/ (Apr. 8, 2017, 14:15).

Post CH AG, „Barcodes und Datamatrix-Codes für Briefsendungen—Anwendung und Erstellung, Jan. 2017.

https://www.support.apple.com/de-de/HT207470 (Oct. 23, 2017, 13:10).

https://www.itunes.apple.com/de/app/qr-code-scanner/id1200318119?mt=8 (Oct. 24, 2017, 10:10).

http://www.aimglobal.org/page/matrix_symb (Oct. 24, 2017, 17:20).

Piccinelli, L.: "Barcode image segmentation", Apr. 22, 2017.

Katona, M.: Nyul L.G.: Improved 1D and 2D barcode detection with morphological operations. 2013.

Arnold et al., Handbuch Logistik, Berlin, Springer, 2018, p. 815-824.

Computer vision. In: Wikipedia, The free encyclopedia. Apr. 14, 2018.

Dorn, S.: Programmieren für Ingenieure und Naturwissenschaftler: Intelligente Algorithmen und digitale Technologien. Springer-Verlag 2018, p. 89-97, 129-145.

\* cited by examiner

METHOD, AUTOMATION SYSTEM AND COMPUTER SYSTEM FOR DETECTING OPTICAL CODES

CROSS-REFERENCE TO RELATED APPLICATIONS

This application claims priority to German Patent Application DE 10 2018 109 392.6, filed Apr. 19, 2018, entitled VERFAHREN ZUM ERFASSEN OPTISCHER CODES, AUTOMATISIERUNGS SYSTEM UND COMPUTER-PROGRAMMPRODUKT ZUM DURCHFÜHREN DES VERFAHRENS, which is incorporated by reference herein, in the entirety and for all purposes.

FIELD

The present invention relates to a method for determining properties of optical codes.

BACKGROUND

Within the framework of automating manufacturing processes, an individual labelling of objects is of great importance. It allows for definite identification and tracking of raw material, partial, semi-finished and finished products. As such, labelling objects is an important basis of individualized production, process control, process optimization, stock-keeping, quality control and documentation. In the field of logistics, as well, it is essential to be able to unambiguously identify and track goods to be transported. Object labelling also allows for backtracking products within the framework of recalls. In individual industry sectors, it may be of utmost importance to be able to completely retrace products in order to guarantee safety. In the pharmaceutical industry, for example, backtracking is statutory in order to be able to recognize counterfeit drugs.

For machine-readable object labelling, optical codes are frequently used. Objects marked by optical codes often comprise a plurality of labels having various objectives and being partly specific to the respective industrial sector and region. Known types of optical codes are e.g. the EAN-13 code, code 39, code 128, the PDF417 code, Aztec code, Datamatrix code, Han-Xin code, Maxi code, QR code, Dot code, the High-Capacity-Color barcode and the Per-Colorant-Channel Color barcode. An optical code may comprise a reference pattern or a plurality of reference patterns. The reference pattern may e.g. be a finder pattern, a timing pattern or an alignment pattern. The reference pattern may allow for determining a position, an orientation or a category, e.g., a type of an optical code. Reading out information stored in optical codes is carried out by code-specific read-out algorithms. A code-specific read-out algorithm is e.g. the reference algorithm indicated in the ISO IEC 16022 standard for Datamatrix codes.

An exemplary product may e.g. comprise an EAN-13 code for a sale, a Datamatrix code for backtracking and a QR code for a link to the company website. In addition, potentially existing logos, quality seals or plain-text information may be present. Hereby, simultaneous use of several labels renders image analysis more difficult as a majority of differing image objects have to be detected, localized and interpreted.

If a continuous stream of moving characterized objects is analyzed, maximum time spans for an optical analysis of individual objects have to be observed. Otherwise, there would be no available computing capacity of processing subsequent objects and/or actuating actuators would not be possible in a fast enough manner. For stable operation, it makes sense if processing times are subject to as little variations as possible. In this context, it is to be considered that within the framework of code recognition by image analysis only one image is usually available.

A detection of optical codes, e.g., determining whether and, as the case may be, where an optical code is to be found in an image is a non-trivial problem. It is an object during the recognition of optical codes to discern the optical codes from other markings as well as to determine their position, orientation and category. This may be complicated by image disturbances. The optical codes may be partly covered up or destroyed. Code detection is particularly difficult if the code-specific reference pattern is affected. Moreover, the appearance of the optical codes is subject to certain variations; it is e.g. possible to apply optical codes in an inverted manner.

A known approach in order to simplify detection consists in predefining definite positions for various optical codes. In the course of individualized production and internationalization of the transport of goods, however, it may not be unquestionably assumed that the positions of the codes to be read out applied to the marked objects are known from the outset.

Neural networks are data-processing structures that have been devised on the basis of networks of nerves of organisms. Said networks have been very successfully employed for various tasks. In particular, so-called deep neural networks comprising many layers of neurons have led to clear improvements in many pattern-recognition tasks, amongst others in the field of evaluating images and speech-pattern recognition.

In image processing, convolutional neural networks (CNNs) are particularly used. In the case of CNNs, two-dimensional convolution—an operation known from image processing—or the related technique of cross-correlation is used.

CNNs are known that are combined with extreme learning machines (ELMs), resulting in what is referred to as ELCNNs. By means of these, a number of required training data as well as a time required for training a CNN itself is reduced.

The publication DE 101 37 093 A1 discloses a method for recognizing optical codes by means of a neural network. Within the framework of the method, determining an activity value is carried out on the basis of an input image. The activity value provides a measure for a congruence of the supplied input image data set with taught-in data sets. For each input image and for each taught-in category, the neural network determines an activity value. The activity value comprises an information on the position of an optical code. The input image may also be divided up into partial input images so that each partial input image and each taught-in category is assigned an activity value.

SUMMARY

An object of the present disclosure is to provide an improved method for detecting optical codes and an automation system and a computer-program product for carrying out the method.

EXAMPLES

A method for detecting optical codes comprises the following method steps. An input image is provided. Optical codes in the input image are detected by generating an output image on the basis of the input image. Within the framework of generating the output image, pixels of an area of the input image comprising a part of an optical code are assigned a first intensity in the output image. Within the framework of generating the output image, pixels of an area of the input image comprising no part of an optical code are assigned a second intensity in the output image. Regions of the output image having the first intensity are provided for determining properties of the detected optical codes.

A property of an optical code may e.g. be its position, its size, its orientation, its category or its quality or a combination of the mentioned examples. The position or the size or the orientation of an optical code may e.g. be determinable with regard to the input image or with regard to a product containing the optical code. The orientation of an optical code may e.g. be indicated as an angle of rotation or as a two-dimensional vector or as values for a displacement along predetermined coordinate axes. The quality of an optical code that is also referred to as code quality may e.g. be indicated by a numerical value. In order to evaluate the quality, e.g. a contrast value of an optical code or an image resolution of an optical code or a reflectance of an optical code or a color of an optical code may be relevant. For linear barcodes, a quality grading is e.g. specified in the ISO/IEC 15416 standard. For 2D-matrix codes, a quality grading is e.g. specified in the ISO/IEC 15415 standard.

In an embodiment, generating the output image is carried out by a first neural network, particularly a deep trained convolutional neural network (CNN). Advantageously, the first neural network that is configured as a CNN may, within the framework of a training, learn processes that require a manual set-up of image-processing chains in classical algorithms. This may involve a lot of time and be susceptible to errors and may also require a lot of expert knowledge. A CNN on the other hand may learn image-processing operations by a training algorithm, thus allowing for a certain independence from expert knowledge.

In an embodiment, providing the input image comprises adjusting the input image. Adjusting the input image is carried out in such a way that an adapted input image has a size that is compatible with a size of a first input layer of the first neural network. Advantageously, the first neural network may process the adjusted input image.

In another embodiment, determining the properties of the optical codes is carried out by determining the positions of the optical codes. Determining the positions of the optical codes is achieved by assigning enclosing rectangles, outer contours and/or geometrical centers to the regions of the output image having the first intensity. Advantageously, the specific positions of the optical codes allow for determining further properties of the optical codes.

In an embodiment, assigning the enclosing rectangles, outer contours and/or geometrical centers is carried out by blob detection, morphological operators and/or binarization of the output image in combination with contour tracking.

In an embodiment, determining the positions of the optical codes comprises transforming the enclosing rectangles, outer contours and/or geometrical centers to correspond to the input image. As a result, the positions of the optical codes are advantageously known in the input image and e.g. not only in the adjusted input image.

In another embodiment, the properties of the optical codes are determined by extracting code images on the basis of the determined positions of the optical codes and by determining orientations and/or categories of the optical codes on the basis of code images. Advantageously, determining orientations and/or categories of the optical codes allows for a simplified read-out of information stored in the optical codes. If e.g. the category is known, a suitable read-out algorithm may be chosen for reading out.

In an embodiment, determining orientations and/or categories of the optical codes is carried out by a second neural network, in particular a deep trained convolutional neural network. Advantageously, the second neural network may simultaneously learn the determining of orientations and/or categories of the optical codes within the framework of a training and determine them at the same time within the framework of a prediction.

In an embodiment, extracting the code images comprises adjusting the code images. Adjusting the code images is carried out in such a way that the adjusted code images each have a size that is compatible with a size of a second input layer of the second neural network. Advantageously, the second neural network may process the adjusted code images.

In another embodiment, determining orientations and/or categories of the optical codes comprises extracting general features by a third neural network, in particular by an auto-encoder, as well as a regression and/or a classification. Advantageously, a complex calculation of suitable features for representing optical codes is thereby separated from the actual task of determining the category. As a result, it is e.g. possible to exchange a classifier without complex training, e.g. in order to meet specific customer demands or to add a new category.

In an embodiment, a characteristic of an extracted general feature is examined for novelty by a novelty detector. An advantage of the novelty detector is that it may indicate whether a characteristic of the extracted general feature corresponds to a learnt spectrum or lies outside of a learnt spectrum. If the characteristic of an extracted general feature is outside of the learnt spectrum, a classification and/or regression connected to it may be discarded as it is not possible to make any verified statements about it.

In another embodiment, determining the properties of optical codes is carried out by reading out information stored in the optical code.

In an embodiment, determining a property of one single optical code and/or determining a plurality of properties of one single optical code and/or determining a property of a plurality of optical codes and/or determining a plurality of properties of a plurality of optical codes is carried out in parallel. Advantageously, a plurality of properties of a plurality of optical codes may be determined in this manner.

An automation system comprises a control unit, a transport system and a detection device. The transport system and the detection device are each connected to the control unit via a field bus and may be actuated by the control unit. The transport system is embodied to transport workpieces marked by optical codes through a detection area of the detection device. The detection device is embodied to generate input images of the workpieces marked with the optical codes and to provide them to the control unit. The control unit is embodied to carry out the method for detecting optical codes by the input images provided by the detection device.

In an embodiment of the automation system, the control unit is embodied to finalize the method within one single control cycle of the automation system.

In another embodiment, the control unit comprises a processor unit and a memory. A first neural network and/or a second neural network and/or a third neural network are stored in the memory. The control unit is embodied to carry out the method for detecting optical codes by the processor unit and the first neural network and/or the second neural network and/or the third neural network stored in the memory.

A computer-program product comprises commands that, when executing the computer program on a computer, cause said computer to carry out the method for detecting optical codes.

BRIEF DESCRIPTION OF THE DRAWINGS

The above-described properties, features and advantages of the present invention as well as the manner in which they are achieved will become clearer in context with the following description of embodiment examples that are explained in detail in conjunction with the drawings, in which.

DETAILED DESCRIPTION

Figure 1:
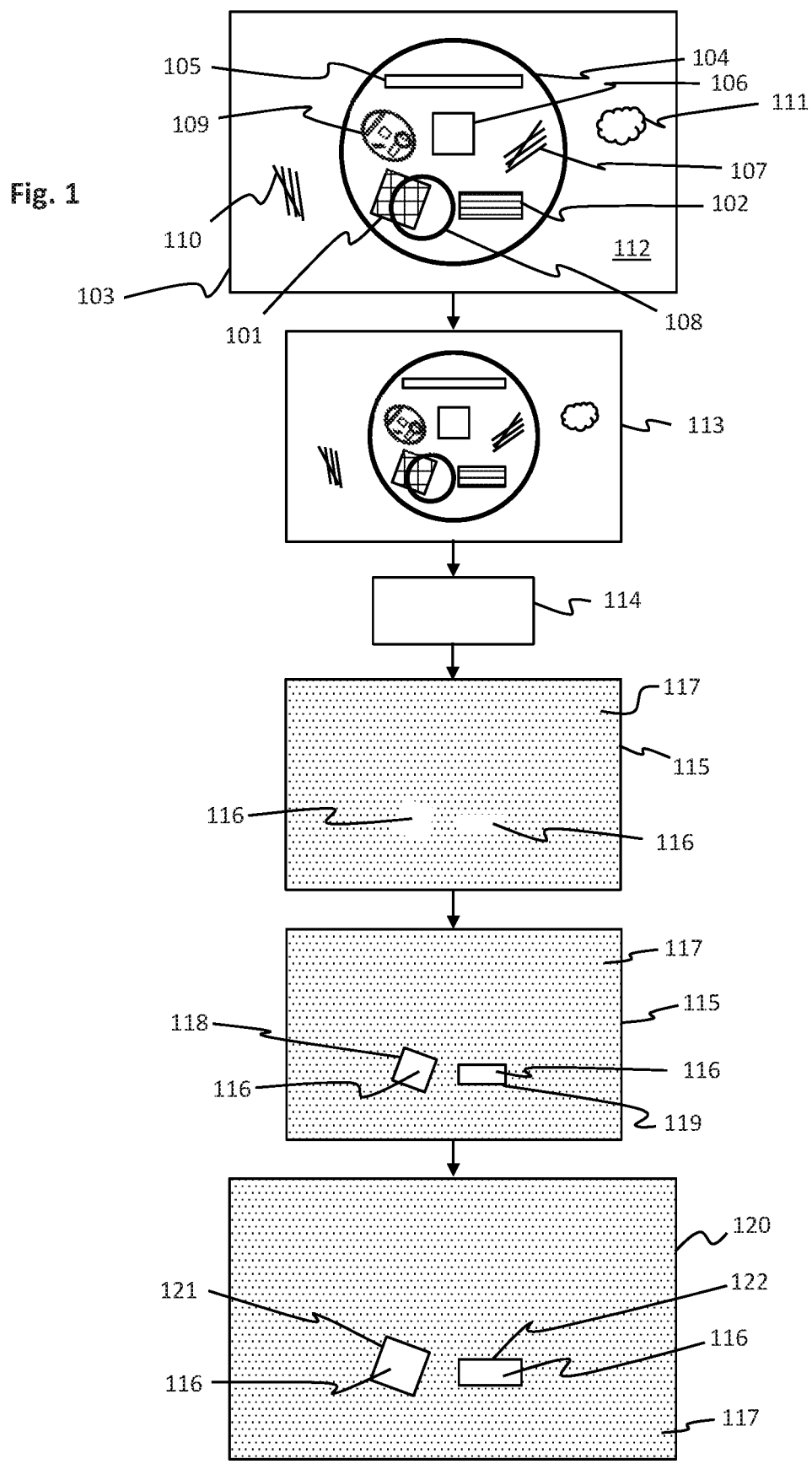
FIG. 1 depicts method steps of a method for detecting optical codes.

FIG. 1 schematically shows method steps of a method for determining optical codes 101, 102.

Within the framework of a first method step, an input image 103 is provided. The input image 103 e.g. shows a workpiece 104. The workpiece 104 may be any desired product. In the depiction of the input image 103, the workpiece 104 exemplarily comprises a cross-section in a circular disc shape. The workpiece 104 was exemplarily labelled with a first optical code 101 and with a second optical code 102. However, the workpiece 104 may have been labelled with any desired number of optical codes 101, 102.

The optical codes 101, 102 may each be assigned a category. The first optical code 101 is exemplarily embodied as a matrix code. By way of an example, the first optical code 101 is a QR code. The first optical code 101 may, however, also be an optical code of any other category. The first optical code 101 is arranged in such a way that it appears rotated in the input image 103, e.g., the edges of the first optical code 101 are embodied slant with regard to the edges of the input image 103.

The second optical code 102 is exemplarily embodied as a one-dimensional barcode, e.g., the second optical code 102 encodes information merely in one direction orthogonally to its bars. By way of an example, the second optical code 102 is an EAN-13 code. The second optical code 102 may, however, be an optical code of any other category. In contrast to the first optical code 101, the second optical code 102 was exemplarily arranged in such a way that the edges of the second optical code 102 are embodied in parallel to the edges of the input image 103.

Apart from the first and second optical code 101, 102, the workpiece 104 comprises additional elements that may complicate detection of the optical codes 101, 102 since they may be similar to the optical codes 101, 102. By way of an example, the workpiece 104 comprises plain-text information 105, a logo 106, a first unevenness 107, an illumination artefact 108 and a reflection artefact 109. The plain-text information 105 and the logo 106 may e.g. have similar intensity patterns as an optical code 101, 102. The first unevenness 107 may e.g. be scratches and have a similar intensity pattern as the second optical code 102 embodied as an EAN-13 code. The illumination artefact 108 was recorded when generating the input image 103 with an associated optional illumination of the workpiece 104. The illumination artefact 108 overlaps with the first optical code 101, as can be seen in FIG. 1, and changes the appearance of the first optical code 101. The reflection artefact 109 was exemplarily embodied as a mirrored image of the workpiece 104 and was recorded when generating the input image 103, as well.

Apart from the workpiece 104, the input image 103 shows a second unevenness 110 and impurities 111 that occur in the vicinity 112 of the workpiece 104 and were recorded within the framework of recording the input image 103. The elements located in the vicinity 112 of the workpiece 104, too, may be similar to the optical codes 101, 102, and complicate detection of the optical codes 101, 102.

Providing the input image 103 may comprise an optional pre-processing of the input image 103. Pre-processing may e.g. comprise debayering techniques, a filtering of pixels, a shading correction, color-space conversion, contrast improvement, intensity standardization and other image-transforming operations.

Providing the input image 103 may comprise an adjustment of the input image 103. Adjusting the input image 103 serves the purpose of providing the adjusted input image 113 with a suitable size for further processing. Adjusting the input image 103 may e.g. be carried out by scaling the input image 103, as is e.g. shown in FIG. 1, wherein the input image 103 was downsized in order to generate the adjusted input image 113. Adjusting the input image 103 may, however, also be carried out by subdividing the input image 103 into adjusted, disjoint or overlapping partial input images. Optional pre-processing may also be carried out after adjusting the input image 103. However, adjusting the input image 103 may also be omitted.

Adjusting the input image 103 may also be carried out in such a way that the adjusted input image 113 comprises a size compatible to a size of a first input layer of a first neural network 114. For example, a number of pixels of the adjusted input image 113 may correspond to a number of neurons of the first input layer of the first neural network 114. Hereby, adjusting the input image 103 may also be carried out by scaling or subdividing the input image 103.

In a second method step for detecting the optical codes 101, 102 in the input image 103, an output image 115 is generated on the basis of the input image 103 or on the basis of the adjusted input image 113. Generating the output image 115 is carried out by a first reproduction.

During generation of the output image 115, e.g., within the framework of the first reproduction, pixels of an area of the input image 103 or, respectively, of the adjusted input image 113 comprising a part of an optical code 101, 102 are assigned a first intensity 116 in the output image 115. The first intensity 116 may e.g. be a maximum intensity, e.g., the pixels of the output image 115 with the first intensity 116 may e.g. be white. During generation of the output image 115, e.g., within the framework of the first reproduction, pixels of an area of the input image 103 or, respectively, of the adjusted input image 113 comprising no part of an optical code 101, 102 are furthermore assigned a second intensity 117 in the output image 115. The second intensity 117 may e.g. be a minimum intensity, e.g., the pixels of the output image 115 with the second intensity 117 may e.g. be black. Alternatively, the output image 115 may only comprise pixels with the first intensity 116 for those pixels of the input image 103 or, respectively, the adjusted input image 113 that belong to a reference pattern of the first and/or the second optical codes 101, 102. A reference pattern may e.g. be embodied as a finder pattern, as a timing pattern or as an alignment pattern.

The first reproduction may be an approximation, e.g., apart from the first intensity 116 and the second intensity 117 further intensities may be present in the output image 115. The brighter a pixel of the output image 115, the surer is its assignment to an optical code 101, 102. The further intensities may e.g. comprise intensities between the first intensity 116 and the second intensity 117, e.g., pixels of the output image 115 having further intensities may e.g. have various shadings of grey. The further intensities may, however, also comprise intensities that are larger or smaller than the first or, respectively, the second intensity 116, 117. The fact that the first reproduction may be an approximation means that the regions of the output image 115 comprising the first intensity 116 do not necessarily have to exactly correspond to the regions of the input image 103 or, respectively, of the adjusted input image 113 comprising the optical codes 101, 102. For example, only a part of a region of the input image 103 or, respectively, the adjusted input image 113 may be assigned the first intensity 116 in the output image.

The first reproduction may e.g. be carried out by the first neural network 114. The first neural network 114 generates the output image 115 on the basis of the input image 103 or of the adjusted input image 113. The first neural network 114 may in particular be a deep convolutional neural network (CNN) that was trained to generate an output image 115. The first neural network 114 may in particular be combined with extreme learning machines (ELMs) wherein such a combination is referred to as ELCNN. Alternatively, the first neural network may be a fully convolutional network (FCN).

FCNs are a special case of CNNs in which the processing functions of all network layers are limited to typical operators of CNNs, in particular convolution and pooling for local statistical evaluations. Like ELCNNs, FCNs allow for a reproduction of images to correspond to images. By a multi-stage encoder network, global structural information of the input image 103 may at first be extracted. By a decoder network and direct connections of layers of the encoder network to corresponding layers of the decoder network, a combination of localizing and structural information may be obtained. This information may be assembled to result in an output image 115.

Within the framework of a third method step, regions of the output image 115 with the first intensity are provided to determine the properties of the detected optical codes 101, 102.

Determining the properties of the optical codes 101, 102 may comprise determining positions of the optical codes 101, 102. Determining the positions of the optical codes 101, 102 is carried out by assigning enclosing rectangles 118, 119, outer contours or geometrical centers to the areas of the output image 115 having the first intensity 116. In the exemplary depiction of FIG. 1, a first enclosing rectangle 118 was assigned to the first optical code 101 and a second enclosing rectangle 119 was assigned to the second optical code 102. By assigning the enclosing rectangles 118, 119, the positions of the optical codes 101, 102 were determined, e.g., unique positions are assigned to the optical codes 101, 102 that were detected by generating the output image 115, e.g., localized. The positions of the optical codes 101, 102 result from the positions of the enclosing rectangles 118, 119, the outer contours and/or the geometrical centers.

In contrast to a geometrical center that is assigned to a region of the output image 115 with the first intensity 116, an enclosing rectangle 118, 119 and an outer contour have the advantage that an expansion of an optical code 101, 102 may be taken into account when determining its positions. If a region of the output image 115 having the first intensity 116 or, respectively, an associated outer contour strongly deviates from a rectangular shape, said region may be embedded into a smallest enclosing rectangle.

Determining the positions of the optical codes 101, 102 may e.g. be carried out by blob detection, morphological operators and/or binarization of the output image 115 combined with contour tracking.

Determining the positions of the optical codes 101, 102 may comprise transforming the enclosing rectangles 118, 119, the outer contours and/or the geometrical centers to the input image 103. This may e.g. be appropriate if an adjustment of the input image 103 has been carried out to generate the output image 115. In this case, the specific positions refer to the output image 115 generated by the adjusted input image 113 so that the output image 115 and the input image 103 have different sizes. Transforming the specific positions may provide transformed positions of the optical codes 101, 102 that refer to a transformed output image 120 that is identical in size to the input image 103. A transformation may also be appropriate if the size of the first input layer of the first neural network 114 deviates from a size of a first output layer of the first neural network 114. In this case, the specific positions in the output image 115 may deviate from the actual positions in the input image 103 although the input image 103 has not been subjected to an adjustment.

The transformation process is exemplarily shown in FIG. 1 in conjunction with a transformed output image 120 that has a size identical to the size of the input image 103. The transformed output image 120 comprises transformed enclosing rectangles 121, 122. A first transformed enclosing rectangle 121 provides the position of the first optical code 101 in the input image 103. A second transformed enclosing rectangle 122 provides the position of the second optical code 102 in the input image 103.

As mentioned, the first reproduction, e.g., generating the output image 115, may e.g. be carried out by the first neural network 114. For this purpose, the first neural network 114 has to be trained to carry out the first reproduction.

In order to be able to train a neural network, a very high number of training data may be required. As the optical codes are artificial structures, they may be artificially generated in any desired amounts. Hence, it is not necessary to collect and annotate large data sets.

An artificially generated training-data pair comprises a training-input image and a training-output image corresponding thereto. The training-output image thereby comprises pixels having the first intensity 116 for each pixel in the training-input image belonging to an optical code. Alternatively, the training-output images may also only comprise pixels with the first intensity for each pixel in the training-input image belonging to a reference pattern of an optical code. All other pixels are assigned the second intensity 117.

If a plurality of optical codes are contained in a training-input image, the corresponding training-output image comprises several areas with the first intensity. After the first reproduction has been sufficiently well learnt by the first neural network 114, the first neural network 114 may itself generate the corresponding output images 115 on the basis of input images 103.

Due to the extremely high number of parameters to be learnt in a CNN, a very high number of training examples may be required. These may be generated by providing training-input images showing different optical codes at different positions, in different orientations and sizes, are generated together with corresponding training-output images. If e.g. training examples for five individual optical codes at ten different horizontal positions, ten different vertical positions, with 36 orientations and ten different sizes, respectively, are generated, this results in 180,000 training examples. It may also make sense to use further training examples having a plurality of optical codes or without optical codes.

Figure 2:
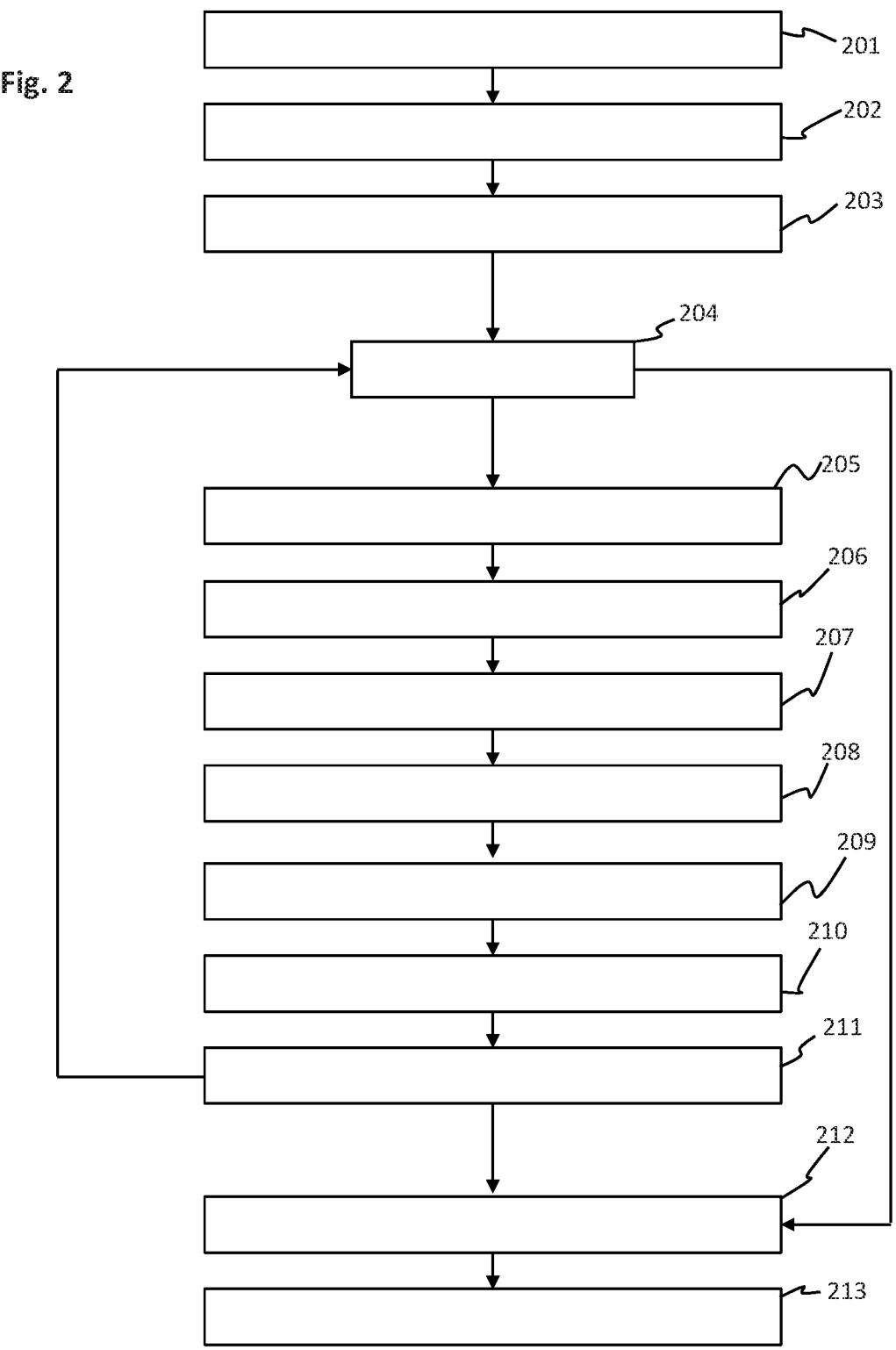
FIG. 2 shows a flow chart for generating a training-data pair consisting of a training-input image and a training-output image.

FIG. 2 schematically shows a flow chart for generating one single training example, e.g., a training-data pair consisting of a training-input image and a training-output image.

Within the framework of a first step 201, a background image is chosen from a database. Within the framework of a second step 202, a preliminary output image with a second intensity is generated, e.g. in black, wherein the preliminary output image exclusively comprises the second intensity. While the background image may have a random size, the preliminary output image is generated having a size that is compatible with the first output layer of the first neural network 114.

Within the framework of a third step 203, areas in the background image are chosen and marked in which optical codes are allowed to occur. For example, in the input image 103 shown in FIG. 1 the optical codes 101, 102 are only allowed to occur in areas in which the workpiece 104 is depicted, as the optical codes 101, 102 cannot be arranged outside of the workpiece 104. Choosing and marking the areas of the background image in which the optical codes are allowed to occur may e.g. be carried out by a mask image. The mask image may be overlaid with the background image in order to mark the areas of the background image in which optical codes are allowed to occur. For example, the mask image may have an area for a workpiece 104 with a circular disc shape, as shown in FIG. 1, that has a circular disc shape, as well. Optical codes can only occur within a corresponding area of the background image with a circular disc shape.

Within the framework of a fourth step 204, a decision is made whether an optical code is to be sketched into the background image. If so, a fifth step 205 is carried out after the fourth step 204. If not, a twelfth step 212 is carried out after the fourth step 204. In the following, the fifth step 205 and the steps following the fifth step 205 are explained.

Within the framework of the fifth step 205, an optical code is generated in a normal orientation, which means, for example, that the optical code is centered and generated with a rotational angle of 0°. The optical code may also be generated with a predetermined size and a predetermined color scheme, e.g. black and white.

In a sixth step 206, a geometrical transformation is determined, e.g. of an affine or perspective geometrical transformation that maps the generated optical code in an area of the background image that is admissible, e.g., marked by a mask image.

In a seventh step 207, a pixel transformation of the optical code is determined. The pixel transformation may e.g. comprise inverting or adjusting the colors of the optical code.

In an eighth step 208, local interferences are generated, wherein e.g. noise, scratching or defect areas of the optical code are generated.

In a ninth step 209, the optical code that has been transformed by geometrical transformation, pixel transformation and the generated local interference is sketched into the admissible area of the background image. Said sketching may e.g. be carried out by using alpha-blending.

In a tenth step 210, the trainings-output image is generated by marking the image areas in the preliminary output image corresponding to the transformed optical code with a first intensity. For example, the image areas in the preliminary output image may be marked in white. Additionally, the category of the optical code may be indicated by a color information in the preliminary output image.

In an optional eleventh step 211, the admissible areas of the background image are adjusted in order to avoid superimpositions of optical codes. For example, adjusting may be carried out in such a way that an area within the mask image corresponding to the transformed optical code is marked. The eleventh step 211 may be carried out prior to the tenth step 210.

After the tenth step 210 or the eleventh step 211, the fourth step 204 may be carried out again, e.g., a decision may be taken whether a further optical code is to be sketched into the background image. If this is not the case, global interferences such as scratches that may extend over large image areas, noise, impurities or code-like structures are added in the twelfth step 212, thus generating the training-input image. The twelfth step 212 may also be carried out after the fourth step 204 if no optical code is to be sketched into the background image in the fourth step 204.

In a thirteenth step 213, one or a plurality of training-data pairs are stored. For this purpose, one or a plurality of training-input images are at first generated from the background image using the transformation that may be required for adjusting to the first input layer of the first neural network 114. This process may also comprise dividing up the background image into disjoint or overlapping partial images. Furthermore, by the same transformation and, as the case may be, an additional transformation compensating the differing size of the input and output layers of the CNN, one or a plurality of training images are generated from the preliminary output image. Corresponding pairs each consisting of a training-input image and an associated training-output image are provided and stored as training-data pairs.

It is important when generating training-data pairs that the data set is as representative as possible, e.g., that is comprises sufficient examples for all relevant characteristics of all variances of the optical codes. Otherwise, a CNN may be severely limited in its performance for non-existent or under-represented transformations and interferences. Furthermore, alternative image structures such as readable text, serial numbers or the like should also be contained in the training data set and be generated simultaneously. The use of Asian characters may make sense, too, as the almost square shape of the notation may have a very strong resemblance to matrix codes with regard to shape and contrast.

Due to clever distribution of the optical codes to the different characteristics of the variances, the number of the training data to be generated may be reduced. It is e.g. not necessary to generate each optical code at each position in all orientations and any kind of scaling. In this context, e.g.

an optical code or a plurality of optical codes may be randomly chosen for a combination of position, layer and scaling.

Generating the training data may be carried out independently from a training process. The training data may e.g. be stored in a data system and be loaded during training of the first neural network 114. This approach, however, is very slow and may require a lot of memory space on a storage medium. It is more advantageous to generate the training data as desired during the training process. Thereby, slow accesses to the data system are prevented. Apart from the generation of the training data on a central processing unit (CPU), it is possible to calculate them on a graphics processing unit (GPU). This increases efficiency, in particular if the actual training is realized by a GPU, as well, as in such a case individual images are present in the memory of the GPU and do not have to be copied to the memory of the GPU via a comparatively slow interconnection between CPU and GPU.

In order to be able to learn the first reproduction by training data, the first neural network 114 needs a suitable structure, e.g. a specifically adjusted CNN. For example, a morphological CNN (MCNN) may be particularly suitable for recognizing code structures. CNNs are based on a convolution and correlation operation. Corresponding filters of the CNNs, however, only provide one potential approach for image processing. Examples for filters are frequency filters (e.g., low-pass filters), edge recognition and template matching. In order to filter or to detect shape-based features, however, other operations may be more appropriate, in particular morphological operations. In contrast to convolution, however, the corresponding functions may not be differentiated. As a result, an expansion of CNNs exists by which morphological operators are approximated and, as a result, necessary gradients for the training may be calculated. Such expanded CNNs are referred to as MCNNs.

It is possible to combine several CNNs for determining different categories of optical codes. For instance, a first CNN may be embodied for detecting barcodes and a second CNN for detecting matrix codes. In this context, both CNNs may also be realized as one single combined CNN that comprises elements of the first and second CNN as partial components. Output images 115 may in this context either be provided separately or be combined in a multi-channel output image 115. This allows for a first rough determination of a category of an optical code 101, 102. A rough determination of a category refers to a determination which does not result in a category as such.

Determining the properties of the optical codes 101, 102 may comprise extracting code images on the basis of determined positions of the optical codes 101, 102 and determining orientations and/or categories of the optical codes 101, 102 on the basis of code images. Extracting code images and determining orientation and/or the categories of optical codes 101, 102 may be carried out after detecting and after determining the positions of the optical code 101, 102.

Figure 3:
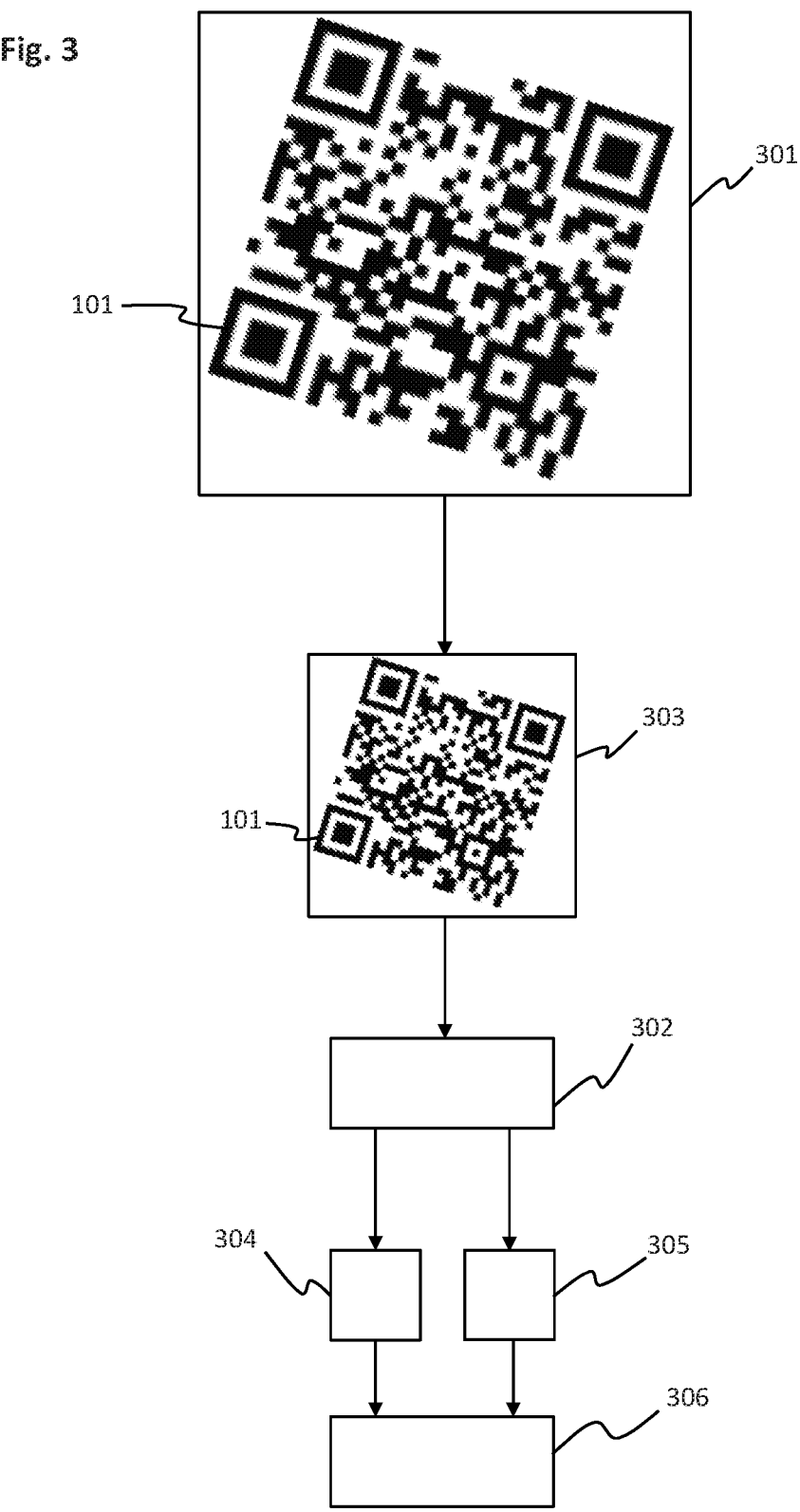
FIG. 3 shows the determination of an orientation and/or a category of a first optical code.

FIG. 3 schematically shows determining an orientation and/or a category by a first optical code 101 on the basis of an extracted code image 301 of the first optical code 101. In order to explain, the first code 101 was chosen exemplarily. The following substantiations for FIG. 3, however, also apply for the second optical code 102 or for any desired other optical codes.

Determining the orientation and/or the category of the first optical code 101 is carried out after detecting the first optical code 101 and after determining its position by assigning the first enclosing rectangle 118 or, respectively, by determining the first transformed enclosing rectangle 121 according to the depiction in FIG. 1.

The orientation of the first optical code 101 may e.g. comprise a rotation, a shearing, a mirror reflection and/or a perspective distortion. In the exemplary depiction of FIG. 3, the first optical code 101 is rotated. During extraction of the first optical code 101, the code image 301 of the first optical code 101 was generated. The code image 301 was generated by extracting a rectangular area of the input image 103. The rectangular area comprises the first optical code 101 and edges of the rectangular area are aligned in parallel to the edges of the input image 103. The rectangular area for extracting the code image 301 may e.g. be defined by a further enclosing rectangle comprising the first enclosing rectangle 118 or, respectively the first transformed enclosing rectangle 121.

Determining the orientation and/or the category of the first optical code 101 may be carried out by a second neural network 302, in particular a deep, trained convolutional neural network. For this purpose, extracting the code image 301 may comprise an adjustment of the code image 301. Adjusting the code image 301 may be carried out in such a way that an adjusted code image 303 has a size compatible with a size of a second input layer of the second neural network 302.

In order to determine the orientation of the first optical code 101, a second reproduction may be carried out. Within the framework of the second reproduction, the code image 301 or, respectively, the adjusted code image 303 is assigned a rotational vector 304 that contains an orientation information on the first optical code. Hence, this is an issue of regression, which has to be learnt by the second neural network 302 within the framework of a training.

Algorithms for reading out optical codes may strongly differ depending on the category of the optical codes. For this reason, the category of an optical code has to be determined in order to be able to select a respectively suitable read-out algorithm. This means that a classification issue has to be solved which may be done by a third reproduction. During a third reproduction, a category label 305 is assigned to the code image 301 or, respectively, to the adjusted code image 303. The category label 305 comprises an information with regard to the category of the optical code. This may be learnt by the second neural network 302 during a training.

After the position of the first optical code 101, its rotational vector 304 and its category have been determined, the properties of the first optical code 101 may be determined by reading out information stored in the first optical code 101 by a suitable reading algorithm 306.

Determining a property of one single optical code 101, 102 and/or determining a plurality of properties of one single optical code 101, 102 and/or determining a property of a plurality of optical codes 101, 102 and/or determining a plurality of properties of a plurality of optical codes 101, 102 may be carried out in parallel. When determining a property of one single optical code 101, 102, a calculation of the property may be parallelized within a neural network 114, 302.

A data set used for the training for determining an orientation and/or a category has to comprise representative training-code images or, respectively, adjusted training-code images of individual optical codes of the categories to be discerned. As in the training for determining the positions of optical codes, the training-code images or, respectively, the adjusted training-code images should show optical codes in differing orientations and with potential interferences as well as being associated with a category label 305 that reflects the shown category. During training for determining an orientation and/or a category, the position of the optical codes has to be varied only to a limited extent or not at all compared to the training for determining the position of optical codes, as the optical codes may be suitably positioned and scaled due to the preceding determination of the position.

The training for determining the orientation and/or the category may be carried out with identical training-code images or, respectively, adjusted training-code images, e.g., the second neural network may simultaneously learn the second reproduction and the third reproduction. In addition to the category label 305, orientation information on the optical codes may be required in the form of rotational vectors for each training-code image or, respectively, adjusted training-code image. Alternatively, the second neural network 302 may separately learn the second and the third reproduction. Moreover, it is possible that the second neural network 302 learns the second reproduction while the third reproduction is learnt by another neural network.

Figure 4:
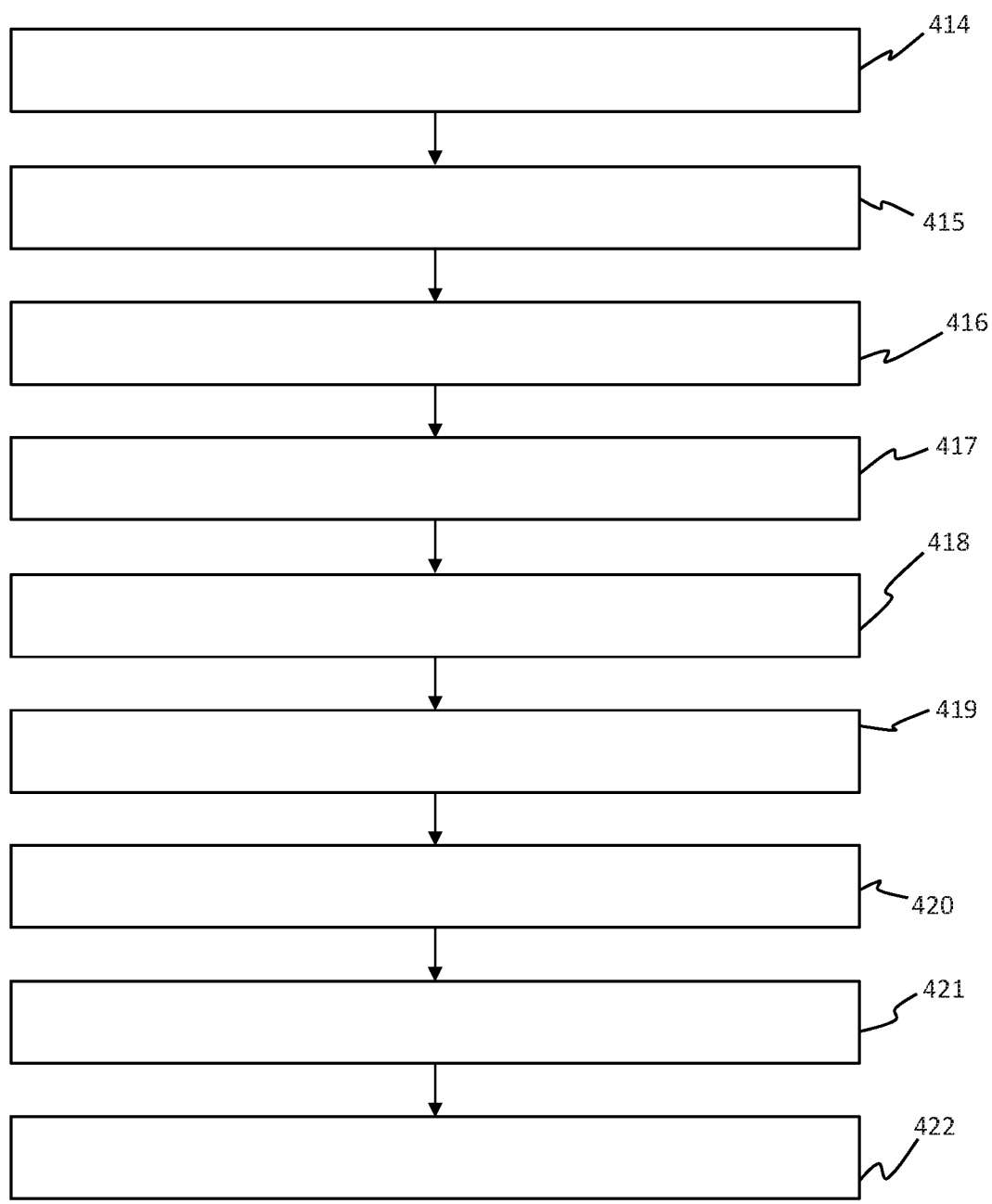
FIG. 4 depicts a general procedure for generating a training example for determining the orientation and/or the category of an optical code.

FIG. 4 schematically shows a diagram of the principle procedure for generating a training example for determining the orientation and/or the category.

During a fourteenth step 414 that is identical to the fifth step 205, an optical code is generated. During a fifteenth step 415, a further geometrical transformation (e.g. affine or perspective) is carried out similarly to the sixth step 206, changing the orientation of the optical code.

In a sixteenth step 416, similar to seventh step 207, a further pixel transformation is carried out. The further pixel transformation may e.g. comprise an inversion or an adjustment of the colors of the optical code.

In a seventeenth step 417, identical to the eighth step 208, further local interferences are generated. The further local interferences may e.g. comprise noise, scratches or defect areas of the optical code.

In an eighteenth step 418, a dimension and an orientation of the optical code transformed by the further geometrical transformation is determined.

In a nineteenth step 419, a further background image is generated that may fully absorb the transformed optical code.

In a twentieth step 420, similar to the ninth step 209, the optical code transformed by the further geometrical transformation, the further pixel transformation and the further generated local interferences is sketched into the further background image. The sketching may e.g. be carried out by alpha-blending.

In a twenty-first step 421 which is identical to the twelfth step 212, global interferences are added such as scratches that may extend over large image parts, impurities or code-like structures.

In a twenty-second step 422, the training-code image generated in the preceding steps is at first adjusted to the size of the second input layer of the second neural network 302. This may also comprise subdividing the further background image into disjoint or overlapping further partial images. Subsequently, the adjusted training-code image is stored together with a category label and a rotational vector of the optical code generated in the fourteenth step 414.

It is possible to train a CNN for determining properties of optical codes for a specific category of an optical code, for a plurality of categories or even for alternative types of labelling such as specific logos or text (characters, letters and numerals).

Figure 5:
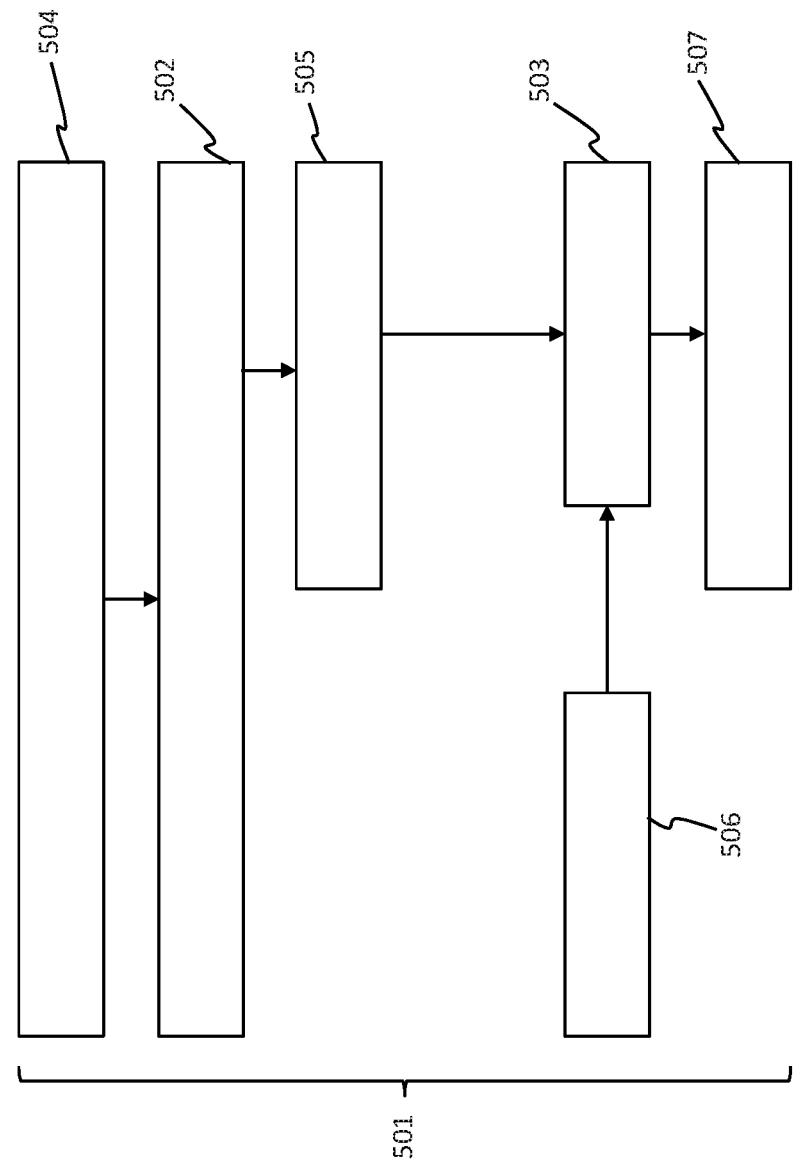
FIG. 5 shows a training process of a neural network.

FIG. 5 schematically shows a training process 501 of the first neural network 114 or the second neural network 302, wherein the training process 501 comprises a basic training 501 and an optional post-training 503.

The training process 501 at first comprises reading-out or generating training data 504 consisting of training-input images and the associated training-output images or training-code images. The read-out or generated training data 504 are provided to the first or the second neural network 114, 302 for the basic training 502. Within the framework of the basic training 502, the first or, respectively, the second neural network 114, 302, learns the first or, respectively, the second and/or the third reproduction. The basic training 502 may e.g. be carried out by stochastic gradient descent. Due to the basic training 502, a pre-trained neural network 505 is provided. The basic training 502 may also comprise an optimization of hyper parameters such as a learning rate and a network structure of a neural network 114, 302. Moreover, the basic training 502 may comprise a final optimization, e.g., in the form of a reduction of structure and complexity of the first and second neural network 114, 302 by network pruning.

During the training process 501, post-training 503 may additionally take place. Hereby, further training data 506 are at first read out or generated. The further training data 506 may e.g. be application-specific training data that may represent additional, application-specific variances of the optical codes. For example, the further training data 506 may comprise training-code images of optical codes of a category that has not been learnt so far.

The read-out or generated further training data 506 are provided to the pre-trained neural network 505 for post-training 503. During post-training 503, the pre-trained neural network 505 may e.g. learn a further reproduction. The post-training 503 may e.g. be carried out by stochastic gradient descent. By the post-training 503, a post-trained neural network 507 is provided. In the post-training 503, the pre-trained neural network 505 may be better adjusted to the respective application by an additional, usually much less complex supplementary training with application-specific data. In an advantageous post-training 503, a few-shot learning approach is used Like the basic training 502, the post-training 503 may comprise a final optimization e.g. in the form of a reduction of the structure and complexity of the neural network by network pruning. The post-training may be carried out as often as desired, using additional training data.

Determining the orientation and/or the categories of the optical codes 101, 102 may alternatively comprise an extraction of the general features by a third neural network 601 and a regression and/or classification. The regression and/or classification may be carried out separate from extracting a general feature.

Figure 6:
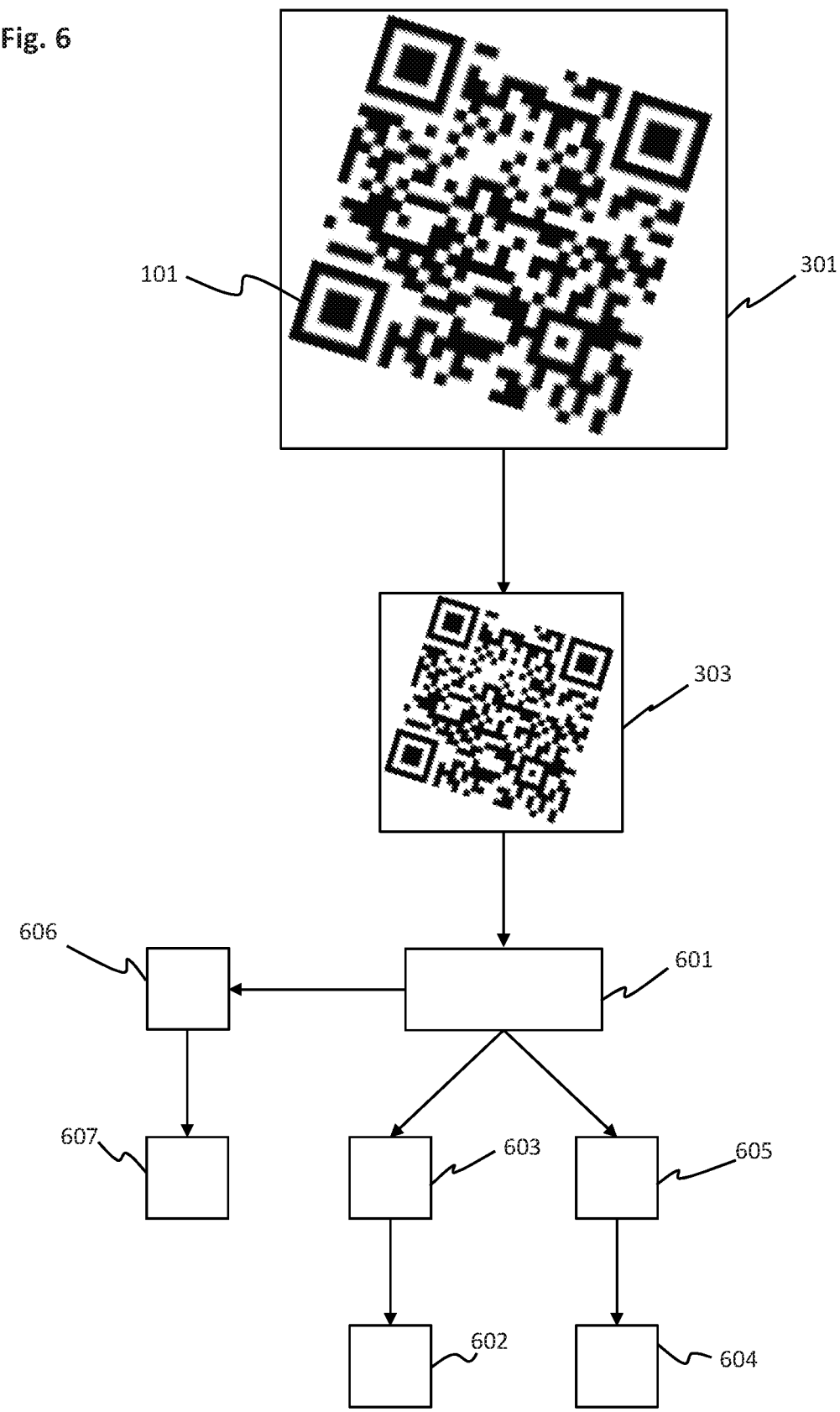
FIG. 6 depicts an alternative approach for determining the orientations and/or the categories of optical codes.

FIG. 6 schematically shows this alternative approach for determining the orientations and/or the categories of the optical codes 101, 102 wherein the approach is exemplarily explained in conjunction with the first optical code 101.

The code image 301 of the first optical codes 101 or the adjusted code image 303 is provided to the third neural network 601. The third neural network 601 was trained for general feature extraction and executes it. The third neural network 601 may e.g. be an auto-encoder based on a deep CNN. During extraction of general features, e.g. a set of formal features may be determined that best approximates the input data, e.g., the code image 301 or the adjusted code image 303.

Auto-encoders are specific variants of neural networks that may also be combined with CNNs. Thereby, a neural network learns to transfer input data into its output layer.

Thereby, encoded forms of the input data are generated and stored in internal layers and may be used after training as general features for another machine-learning concept. In particular, the internal layers may contain considerably less neurons than the input or, respectively, the output layer. In this case, a compressed representation of the input data is learnt.

An advantage when using auto-encoder networks instead of monitored CNNs for classifying and/or regressing image data is that a training may be carried out in a simpler manner. In particular, no annotated, for example no categorized or manually segmented training data may be required, as in contrast to a classification and regression by the second neural network 302, an unmonitored machine-learning approach is used.

As shown in FIG. 6, at least one general feature extracted by the third neural network 601 is provided to machine-learning models for classification and/or regression. To be more precise, a characteristic of the at least one general feature for classification and/or regression is provided. A fourth reproduction of the characteristic of the at least one extracted general feature to a further rotational vector 602 may e.g. be learnt of a support-vector regressor 603 and used during regression. A fifth reproduction of the characteristic of the at least one extracted general feature to a further category label 604 may e.g. be learnt by a support-vector classifier 605 and used during classification.

The approach of general feature extraction in combination with a separate regression and/or classification has several advantages. On the one hand, the complex calculation of suitable features for representing optical codes is separated from the actual task of determining the category and/or orientation. As a result, it is e.g. possible to exchange the support-vector classification 605 without complex training, e.g. to meet specific customer demands or to add a new category. Moreover, a general interface is obtained for solving further, maybe previously unknown pattern-recognition tasks with regard to the detected optical codes. One example for determining a code quality, wherein a numerical dimension characterizing code quality is assigned to the code image, which is an issue of regression, as well.

A further advantage is that by the extracted general features a novelty detector 606, e.g. a single-class support-vector machine may be used, as shown in FIG. 6. Such a novelty detector 606 is based on an unmonitored machine-learning method and may indicate whether data correspond to a learnt spectrum or not. In other words, the novelty detector 606 examines the characteristic of the extracted general features for novelty and provides the result 607 that contains a statement on whether the characteristic of the extracted general feature is known or unknown. Classification and/or regression results that are not within the learnt spectrum may be discarded as no safe statements can be made on those with regard to the property of an optical code. This solves a fundamental problem of CNNs that may provide undefined outputs as a reaction to unexpected input or code images 103, 301.

The use of a monitored CNN and general feature extraction may also be combined. After training the CNNs to determine position or category and/or orientation, general features may be extracted from neuron activations from an internal neuron layer of the CNNs. For this purpose, training examples again have to be presented to the CNN in order to determine the activations of the neurons in question. Said activations may also be referred to as characteristics. By the general features extracted in such a way, a novelty detection may then be trained that may be used together with the monitored CNN.

Figure 7:
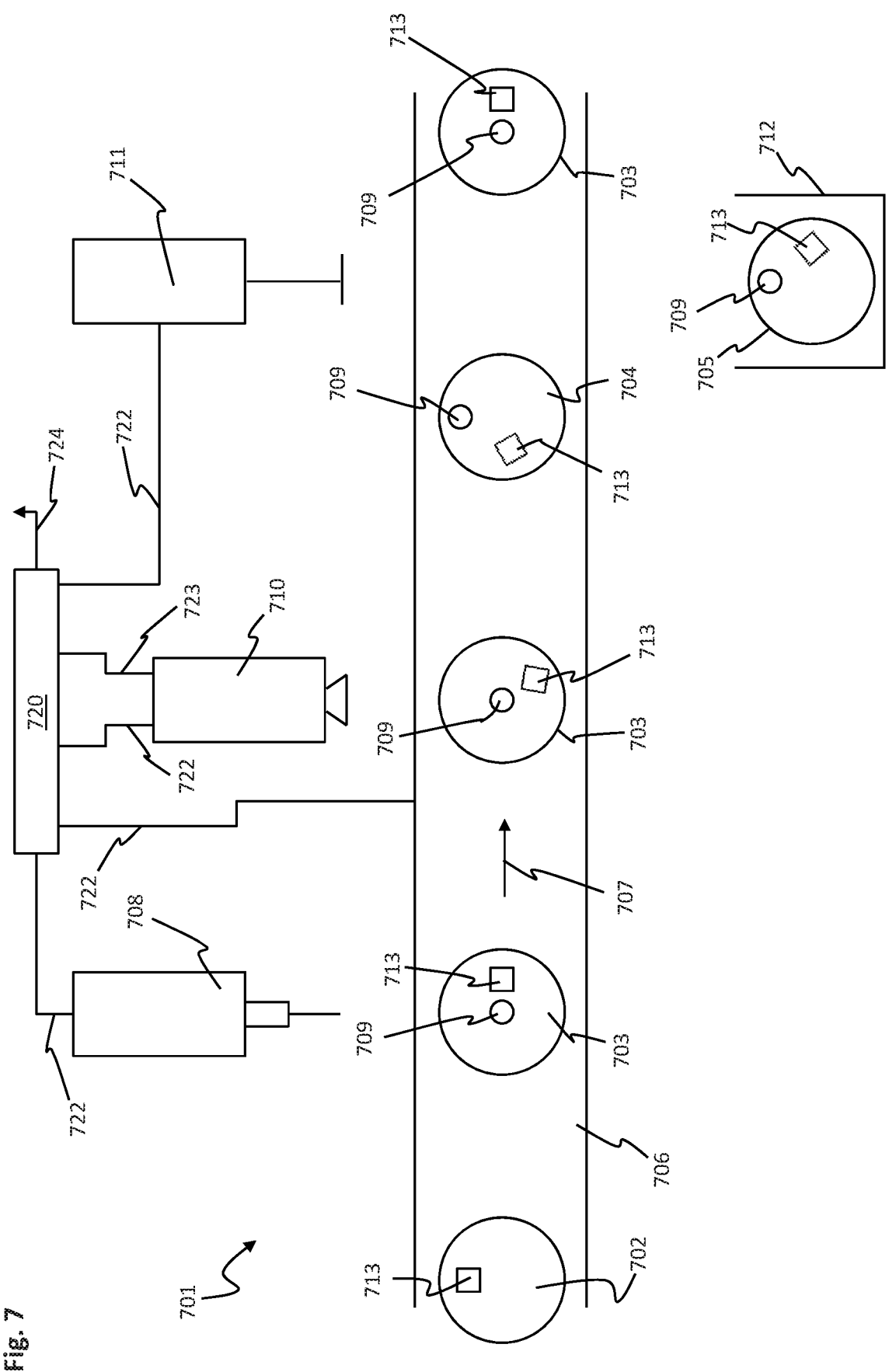
FIG. 7 illustrates an exemplary first automation system for processing workpieces.

FIG. 7 schematically shows an exemplary first automation system 701 for processing workpieces 702, 703, 704, 705. By way of an example, the workpieces 702, 703, 704, 705 have a cross-section with a circular disc shape in FIG. 7.

The workpieces 702, 703, 704 are located on a transport system 706 which conveys the workpieces 702, 703, 704 along a direction of movement 707 of the transport system 706. The transport system 706 is stopped at predetermined time intervals for the purpose of processing the workpieces 702, 703, 704, 705. During a stop of the transport system 706, a tool 708 is used to drill a hole 709 into a workpiece 702, 703, 704, 705 located below the tool 708. The holes 709 are to be drilled into the center of each workpiece 702, 703, 704, 705. In this process, it may occur that a hole 709 is e.g. not arranged in the center. This is why the workpieces 702, 703, 704, 705 are inspected by a detection device 710 and examined for correct position, correct dimension and a quality of the hole 709.

FIG. 7 depicts a yet unprocessed workpiece 702. Moreover, FIG. 7 shows three correctly processed workpieces 703. A faultily processed workpiece 704 remains on the transport system 706. A further faultily processed workpiece 705 is no longer on the transport system 706. The further faultily processed workpiece 705 was recognized as faulty and removed from the transport system 706 by a first actuator 711 for this reason. The further faultily processed workpiece 705 is located in the collecting container 712 for faultily processed workpieces 704, 705.

Each workpiece 702, 703, 704, 705 was marked by a third optical code 713 which allows for backtracking the correctly processed workpieces 703 and of the faultily processed workpieces 704, 705. In order to be backtracked, the third optical codes 713 have to be detected and the properties of the third optical codes 713 have to be determined, which means e.g. that positions, orientations and/or categories of the third optical codes 713 have to be determined and the information on the respective workpieces 702, 703, 704, 705 stored in the third optical codes 713 have to be read out.

The third optical codes 713 of the individual workpieces 702, 703, 704, 705 may belong to different categories. The third optical codes 713 may, however, also belong to one category. In FIG. 7, the third optical codes 713 are exemplarily all embodied as matrix codes, e.g. QR codes. The third optical codes 713, however, are not embodied identically as they each encode various information of the individual workpieces 702, 703, 704, 705.

In order to be able to backtrack the workpieces 702, 703, 704, 705, the third optical codes 713 are detected by the detection device 710. The detection device 710 provides input images for the first neural network 114 and the second neural network 302 or the third neural network 601 and the machine-learning models of the first automation system 701. The properties of the third optical codes 713 are determined by the first neural network 114 and the second neural network 302 or the third neural network 601 and the machine-learning models and the third optical codes 713 are read out by suitable read-out algorithms.

One prerequisite for smooth processing of the workpieces 702, 703, 704, 705 is that results of an image processing that comprises inspecting and determining the properties of the third optical code 713 have to be provided to a first control unit 720 of the automation system 701 at least when a workpiece 702, 703, 704 has reached the first actuator 711. The detection device 710 is positioned such that image processing may be carried out in parallel to the processing of another workpiece with the tool 708. Due to a continuous stream of workpieces, a time available for image processing is limited as subsequent workpieces cannot be inspected in too long an image-processing time.

The first control unit 720 may e.g. be a programmable logic controller which is operated on a computer or, respectively, on a so-called industrial PC. The first control unit 720 is connected to the tool 708, the transport system 706, the detection device 710 and the first actuator 711 via a first field bus 722. The first field bus 722 may e.g. be an Ethernet-based field bus such as EtherCAT or Profinet. The first control unit 720 controls the above-described process of the first automation system 701 and coordinates or, respectively, synchronizes the actions of the mentioned components of the first automation system 701. In this context, e.g. control signals are transmitted to the tool 708 or to the transport system 706 or the detection device 710 or the first actuator 711 from the first control unit 720 via the first field bus 722. Thus, e.g. the first control unit 720 may transmit a control signal to the detection device 710 via the first field bus 722 so that the detection device 710 carries out an image recording.

The detection device 710 is e.g. a digital camera. If considerable image data are to be transmitted form the detection device 710 to the first control unit 720, the data rate of the first field bus may not be sufficient. For this reason, the first control unit 720 is additionally connected to the detection device 710 via a first data line 723. By the first data line 723, large amounts of data may be transmitted within short time. The first data line 723 e.g. has a data rate of more than or corresponding to 1 Gbit/s. If the data rate of the first field bus 722 is sufficient for transmitting image data and/or further data between the first control unit 720 and the detection unit 710, the first data line 723 may be omitted in an embodiment herein. As a result, the first data line 723 is not obligatory.

The first control unit 720 additionally comprises a first network connection 724. By using the first network connection 724, the first control unit 720 may e.g. communicate with further control units herein or with further computers or with a cloud infrastructure. The first network connection 724 may e.g. also be an internet connection for the first control unit 720.

The first control unit 720 comprises at least a processing unit, e.g. a CPU, that may e.g. be a multi-core processor, and optionally at least a GPU on an optional graphics card. In addition, the first control unit 720 comprises at least a memory such as a main memory or a hard disc drive or a flash memory. The above-described image processing routine is e.g. carried out on the first control unit 720 in addition to the control of the process of the first automation system 701 described in FIG. 7. The above-described image-processing routine may in particular be carried out within the control unit of the process of the first automation system 701 described in FIG. 7. The first and/or second and/or third neural network 114, 302, 601 is e.g. stored in at least one memory. The first input layer of the first neural network 114 and/or the second input layer of the second neural network 301 and/or the third input layer of the third neural network 601 are as a result e.g. also stored on at least one memory. The first control unit 720 is embodied to carry out the inventive method by the at least one processor unit and the at least one memory.

The first control unit 720 may be embodied as a real-time control unit. In this case, the first control unit 720 may be embodied to finalize the method for detecting optical codes within one single control cycle of the first automation system 701.

In an alternative embodiment, the described image processing may be completely or partially be carried out in the detection device 710. In this case, the detection device 710 comprises the components that may be required for that, such as a processing unit, e.g. a CPU or a memory.

The first control unit 720 may e.g. carry out a training routine as described in FIG. 5. According to this, training data 504 or, respectively, further training data 506 are stored in at least one memory of the first control unit 720. As an alternative, the first control unit 720 may obtain training data 504 and/or further training data 506 from external further control units or from further computers or from a cloud infrastructure e.g. by the first network connection 724. As an alternative, a training process as it is e.g. described in FIG. 5 may e.g. be completely or partially carried out within a cloud infrastructure. In this case, a request is sent from the first control unit 720 to a cloud infrastructure by the first network connection 724. The request may e.g. comprise information for the at least one relevant property of an optical code. Subsequently, the cloud infrastructure carries out the training process 501 or a part of the training process 501, such as the basic training 502 described in FIG. 5. To conclude the process, at least one pre-trained neural network 505 or at least one post-trained neural network 507 is transmitted from the cloud infrastructure to the first control unit 720 via the first network connection 724. The first control unit 720 is e.g. capable of post-training a neural network received via the first network connection 724, if required. The first control unit 720 may e.g. independently carry out a post-training 503 described in FIG. 5.

Figure 8:
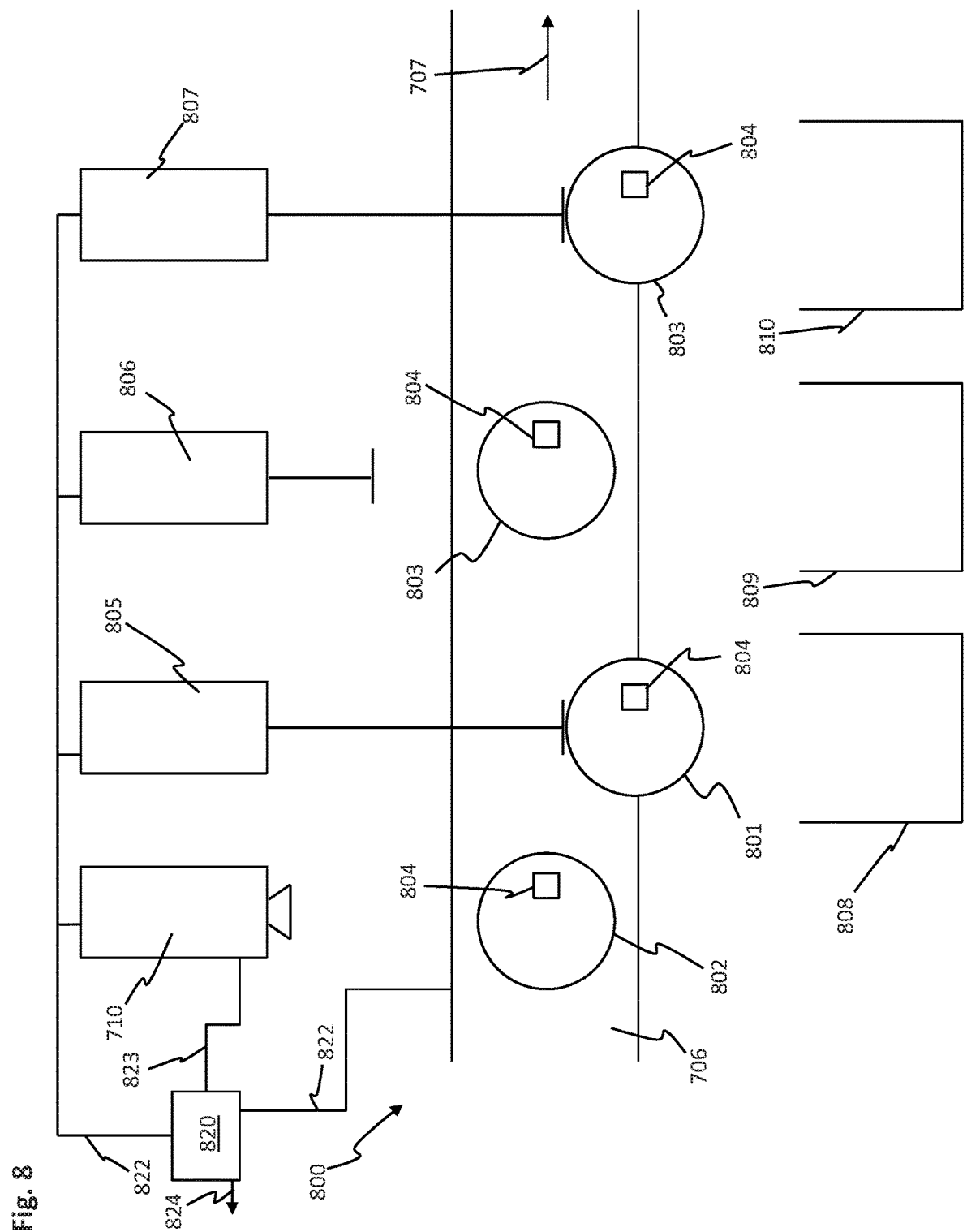
FIG. 8 shows an exemplary second automation system for sorting workpieces.

FIG. 8 schematically shows an exemplary second automation system 800 for sorting workpieces 801, 802, 803. By way of example, in FIG. 8 the workpieces 801, 802, 803 have a cross-section with a circular disc shape.

The workpieces 801, 802, 803 are of different types. FIG. 8 exemplarily shows a first workpiece 801 of a first type, a second workpiece 802 of a second type and two third workpieces 803 of a third type. The workpieces 801, 802, 803 were each marked with a fourth optical code 804. The fourth optical codes 803 of the individual workpieces 801, 802, 803 may belong to different categories. The fourth optical codes 804, however, may also belong to one category. In FIG. 8, the fourth optical codes 804 are exemplarily all embodied as matrix codes, e.g. as QR codes. The fourth optical codes 804, however, are not embodied identically as they each encode various information of the individual workpieces 801, 802, 803. In particular, the fourth optical codes 804 respectively encode the type of a workpiece 801, 802, 803.

The second automation system 800 comprises the detection device 710 also shown in FIG. 7, the transport system 706 moving in a direction of movement and depicted in FIG. 7, a second actuator 805, a third actuator 806 and a fourth actuator 807. During transport of the workpieces 801, 802, 803, the detection device 710 records an input image of each workpiece 801, 802, 803 if the same is located within a detection area of the detection device 710.

A second control unit 820 of the second automation system 800 may e.g. be a programmable logic controller executed on an industrial PC. The second control unit 820 is connected to the transport system 706, the detection device 710, the second actuator 805, the third actuator 806 and the fourth actuator 807 via a second field bus 822. The second field bus 822 may e.g. be an Ethernet-based field bus such as EtherCAT or Profinet. The second control unit 820 controls the sorting of workpieces 801, 802, 803 and coordinates or, respectively, synchronizes the actions of the specified components of the second automation system 800. For this purpose, e.g. control signals of the second control unit 820 are transmitted to the detection device 710 or to the transport system 706 or to the detection device 710 or to the second to fourth actuator 805, 806, 807 via the second field bus 822. In this way, e.g. the second control unit 820 may transmit a control signal to the detection device 710 via the second field bus 722 so that the detection device 710 records an image if one of the workpieces 801, 802, 803 is within the detection area of the detection device 710.

If image data of considerable size are to be transmitted to the second control unit 820 by the detection device 710, the data rate of the first field bus 722 may not be sufficient. For this reason, the second control unit 820 is additionally connected to the detection device 710 via a second data line 823. By the second data line 823, large amounts of data may be transmitted within short time. The second data line 823 e.g. comprises a data rate that is larger or corresponds to 1 Gbit/s. If the data rate of the second field bus 822 is sufficient for transmitting image data and/or further data between the second control unit 820 and the detection device 710, the second data line 823 may be omitted in an embodiment. The second data line 823 is thus not obligatory.

The second control unit 820 additionally comprises a second network connection 824. By using the second network connection 824, the second control unit 820 may e.g. communicate with further control units or with a cloud infrastructure. The second network connection 824 may e.g. be an internet connection for the second control unit 820.

The properties of the fourth optical codes 804 visible in the input image are determined by the second control unit 820 and the information stored in the fourth optical codes 804 is read out by the second control unit 820. The detection unit 710 provides the input images for the first neural network 114 and the second neural network 302 or for the third neural network 601 and the machine-learning models of the second automation system 800. The properties of the fourth optical codes 804 are determined by the first neural network 114 and the second neural network 302 or by the third neural network 601 and the machine-learning models, and the fourth optical codes 804 are read out by a suitable read-out algorithm. Thereby, the type of a workpiece 801, 802, 804 is determined, as well, during the read-out process.

The second control unit 820 comprises at least one processor unit, e.g. a CPU, that may e.g. be embodied as a multi-core processor, and optionally at least a GPU and an optional graphics card. In addition, the second control unit 820 comprises at least a memory such as a working memory or a hard disc drive or a flash memory. The second control unit 820 carries out the inventive method for detecting optical codes and determining the properties of the detected optical codes in addition to sorting workpieces 801, 802, 803. The first and/or second and/or third neural network 114, 302, 601 is e.g. stored on at least one memory of the second control unit 820. The first input layer of the first neural network 114 and/or the second input layer of the second neural network 302 and/or the third input layer of the third neural network 601 are hence e.g. stored in at least one memory.

The second control unit 820 may be embodied as a real-time control unit. In this case, the second control unit 820 may be embodied to finalize the method for detecting optical codes within one single control cycle of the second automation system 800.

By the types of the workpieces 801, 802, 803 determined from the read-out fourth codes 804, sorting of the workpieces 801, 802, 803 is carried out. The workpieces 801 of the first type are conveyed into a second collecting container 808 by the second actuator 805 if they are located below the second actuator 805. Workpieces 802 of the second type are conveyed into a third collecting container 809 by the third actuator 806 if they are located below the third actuator 806. Workpieces 803 of the third type are conveyed into a fourth collecting container 810 by the fourth actuator 807 if they are located below the fourth actuator 807. Workpieces not belonging to one of the three types are transported further by the transport system 706.

A maximum speed of movement of the transport system 706 in this context particularly depends on a maximum processing time for picking up and analyzing a marked workpiece 801, 802, 803. The consequence is that said time should be as short as possible. In an ideal case, no deviations would occur between the time for analyzing all workpieces 801, 802, 803 and said time span would be very short.

A critical issue when using CNNs within the framework of controlling an automation system 701, 800 is a calculation time required for training and prediction (interference). In this context, low prediction times should be observed as they occur directly in a cyclic run of the control unit 720, 820. Training times become relevant if the training data 504 are very extensive and if a post-training 503 is carried out during a running operation or if online learning is to take place. In this context, online learning particularly describes a learning process during operation of an automation system 701, 800.

A general approach to reduce a size of trained neural networks and hence susceptibility to so-called overfitting, e.g. exaggerated specializing on training data, and the number of calculating operations required for prediction and potential post-training is what is referred to as network pruning. In this context, partial components of a neural network, e.g., individual connections between neurons, complete neurons or groups of neurons are removed according to predetermined criteria. Said criteria describe the benefit of the partial component for the entire network. Removing may e.g. be carried out if a benefit is below a defined threshold value. In context with a control unit of an automation system, in particular approaches such as structural pruning make sense in which network components are removed in such a way that a reduced neural network operates as efficiently as possible. After pruning, a neural network usually has to be post-trained in order to reduce a possible performance deterioration.

A computer-program product for detecting optical codes comprises commands that, when executing the computer program on a computer, cause the computer to carry out the method for detecting optical codes.

In the following, a number of hypothetical user scenarios are described to illustrate the application spectrum of the disclosure. The indicated numbers are not measuring values. Instead, they have been chosen such that the desired circumstances could be pointed out more advantageously.

A first user scenario shows the advantage of the method for detecting optical codes that is based on a deterministic calculation time within which the method may be carried out.

Manufacturer A wishes to read out datamatrix codes by which supplier Z has marked their products, using a machine vision system that is integrated in an automated control unit, the purpose being to allow for complete retracing of the products of A and their components. In addition, supplier Z has marked the products with an industry-specific barcode and with a QR code referring to Z's website. Z's products also habitually comprise plain-text information and logos.

Z's products are moved in A's facility, passing a camera at an interval of 60 ms. By the camera, an image is recorded and subsequently provided to the processing computer. This procedure usually takes 10 ms. Another 10 ms are scheduled as a safety buffer for communication and actuating actuators by a control unit. This leaves 40 ms for detecting and reading out one single datamatrix code. A currently used code-recognition function usually requires 35 ms and thus fulfils the demand. If, however, the datamatrix code is not clearly visible or applied at an unsuitable position, this time span increases by several seconds. Due to the fact that the code-recognition function operates sequentially, processing cannot be parallelized although A's control unit provides additional free calculation engines in at least one CPU. Detecting and reading out may then be aborted, however, the content of the datamatrix code would in this case remain unknown.

The method for detecting optical codes solves these problems. The use of CNNs is very deterministic as essentially a fixed number of matrix operations have to be carried out. In addition, these operations may be very well parallelized. In a preprocessing step for reading out the relevant datamatrix code, this allows for determining an image region in which the searched datamatrix code can be found, and to transform it to a normal orientation. The actual read-out algorithm may deliver deterministic results in about 10 ms processing time.

In spite of parallelizing, determining the position is comparatively slow due to the high number of necessary matrix operations with processing times of 55 ms which is typical for CNNs. 25 ms are added for determining category and orientation. This results in a total calculation time of 90 ms for detecting the datamatrix code. In order to be able to use the method for detecting optical codes nevertheless, manufacturer A decides to operate two systems carrying out the method for detecting optical codes in parallel with a time offset of 60 ms. As a result, the calculation time available for image processing increases to 120 ms–10 ms (image recording and providing)–10 ms (safety buffer)=100 ms, providing sufficient calculating time. At 120 ms for each camera image independent from the image content, processing time is still far below the time of up to several seconds that are usually required by the original algorithm for unfavorable images.

A second user scenario shows an advantage of the method for detecting optical codes that consists in the fact that it is possible to exactly determine the position of optical codes. Manufacturer B wishes to represent barcodes attached to their products in a human-machine interface (HMI). Thereby, each product comprises three different barcodes: an EAN-13 code for retail, a 128 code for the serial number and a further 128 code for the article description. The positions of the barcodes are more or less known. Nevertheless, the exact regions of the detected optical codes are to be represented together with the read-out content on an HMI. A currently used read-out algorithm operates according to the principle of a line scanner in which an intensity profile is analyzed along a search line or a small region located horizontally to the barcode. Such an algorithm hence cannot precisely provide the image region in which the read-out barcode is located. A clock rate of the used read-out algorithm is about 100 ms. Representation in the HMI is carried out randomly, only every tenth product being shown in the HMI.

As a result, manufacturer B has decided to use the method for detecting optical codes. Apart from the possibility of depicting the determined image regions, it also allows for more specific use of the read-out algorithm.

A third user scenario shows the advantage of the method for detecting optical codes with general feature extraction and a separate regression and/or classification according to FIG. 6.

Manufacturer C manufactures placement facilities for the Chinese market. Such a facility is capable of fitting a large number of different types of printed circuit boards. In order to be able to identify and trace the printed circuit boards, optical codes are used. Categories, numbers, sizes and positions of these optical code depend on the printed circuit board and may thus be varied. In addition, the printed circuit boards comprise plain text in the form of Chinese characters.

As the charged printed circuit board comprises a lot of small elements and the features of Chinese characters may resemble matrix codes, a code detector used at first led to a high number of patterns erroneously recognized as optical codes that were recognized as other objects only during the read-out process. As a result, the required calculating time is very high and fluctuates strongly depending on the various types of printed circuit boards. Yet, not all optical codes are always recognized. This particularly affects the optical codes that were directly attached on the printed circuit board and were not attached with a printed sticker as for such optical codes, the characteristic reference pattern is often damaged or badly visible.

A solution for the mentioned problems is the method for detecting optical codes. Due to the inherent possibility of parallelizing the method and the comparatively constant runtime of the interference algorithm, relevant code areas may be determined in a deterministic time span and first information on the optical codes to be read out may be provided in the form of detected categories and the orientation of the optical codes.

Due to bad experiences with the predetermined processing routines of conventional code detectors, manufacturer C prefers to use the modular and easily expansible approach of general feature extraction in combination with a separate regression and/or classification. Processing of detected code regions is hence carried out in accordance with FIG. 6.

After the system has been in use for some time, manufacturer C becomes interested in novelty detection as it has turned out that the specifications for the printed circuit boards to be manufactured change frequently and as a result, unexpected patterns resembling optical codes may appear on the printed circuit boards. This problem may not be noticed until read-out, thus strongly increasing read-out times. As a result, such unexpected patterns are to be excluded from the start. Thus, manufacturer C buys a novelty detector that is compatible with the recognition modules used so far. The features necessary for novelty detection are identical to those for determining category and orientation; e.g., additional calculating is not required. The actual novelty detection which may efficiently be carried out by the existing features is carried out in parallel to determining category and orientation on separate processing cores of a CPU or GPU. As a result, the time span after which all analysis results are available does not increase; however, a lot of unnecessary read-out attempts may be avoided, thus reducing read-out time and as a result also the total time for code recognition.

A fourth user scenario shows an advantage of the method for detecting optical codes by a general feature extraction and separate regression and/or classification according to FIG. 6.

Manufacturer D manufactures sorting machines for the logistics industry. Thereby, a large number of optical codes must be read out that e.g. encode a start address, a receiving address, a type of shipment and additional information of a sender. Depending on the shipment, a point of origin and further possibly involved logistics companies, categories, numbers, sizes and positions of the optical codes are variable. In this, the problem is similar to the third user scenario.

Manufacturer D, too, decides on a general feature extraction in combination with a separate regression and/or classification. Thereby, the results from novelty detection are combined with that of category and/or orientation determination so that properties of unknown patterns may be estimated. If e.g. a QR code is recognized, the novelty detector, however, indicates that the pattern is unknown, the following statement is possible: at position X, an unknown optical code was recognized that resembles a QR code. The corresponding goods to be transported may then be specifically forwarded to an employee of D's customer for manual post-control. The employee can then decide on how to proceed further.

In said post-controls, it is noticed that recently a lot of transported goods have Han Xin codes encoding an identification number of the respective object. D's customers would like to use them, however, determination of the category was not trained with Han Xin codes. D thus buys the trained machine learning models for novelty detection as well as category and orientation determination comprising Han Xin codes. After exchanging the machine-learning models, Han-Xin codes may correctly be detected as such and be decoded with a newly acquired read-out functionality.

A fifth user scenario shows the advantage of the method for detecting optical codes according to FIG. 3.

Company E uses the method for determining properties of optical codes as well as the purely CNN-based category and orientation determination according to FIG. 3. Although the optical codes are reliably detected, category and orientation determination are not satisfactory. According to E, the reason for this is that the optical codes are applied to their products directly by a laser. Since the parts are of cast iron and have a characteristic surface structure, the codes are strongly distorted. Company E opts for post-training of the corresponding machine-learning models to render them more robust with regard to the surface structure of their products. Post-training is carried out according to FIG. 5 using images of the company E. E then obtains a classifier and regressor tailor-made for their needs which provide very good results.

Technically, machine learning models can be seen as data. In this context, exchange means that an existing method is carried out with new data. This means that software in the form of programs or, respectively, functions does not necessarily have to be exchanged or adjusted.

A sixth user scenario shows an advantage of the method for detecting optical codes according to FIGS. 1 and 3.

Company F manufactures machines that use a code detection according to FIG. 1 as well as a CNN-based category determination according to FIG. 3. For internal use, a new matrix code is to be introduced which cannot be recognized by the methods used so far. Thus, a machine-learning expert of F has recorded ten representative camera images of optical codes of the new category. By a post-training assistant, the expert expands the machine-learning model for category determination with the new category. As the method for post-training may be based on a few-shot learning approach, e.g., post-training is possible with a small number of training data, post-training may be concluded within a few moments. This allows company F to recognize even optical codes of the new category correctly as such and to specifically provide them for further processing. This may, amongst others, be a corresponding read-out functionality.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

REFERENCE LIST 101 first optical code
102 second optical code
103 input image
104 workpiece
105 plain-text information
106 logo
107 first unevenness
108 illumination artefact
109 reflection artefact
110 second unevenness
111 impurities
112 workpiece vicinity
113 adjusted input image
114 first neural network
115 output image
116 first intensity
117 second intensity
118 first enclosing rectangle
119 second enclosing rectangle
120 transformed output image
121 first transformed enclosing rectangle
122 second transformed enclosing rectangle
201 first step
202 second step
203 third step
204 fourth step
205 fifth step
206 sixth step
207 seventh step
208 eighth step
209 ninth step
210 tenth step
211 eleventh step
212 twelfth step
213 thirteenth step
301 code image
302 second neural network
303 adjusted code image
304 rotational vector
305 category label
306 read-out algorithm
414 fourteenth step
415 fifteenth step
416 sixteenth step
417 seventeenth step
418 eighteenth step
419 nineteenth step
420 twentieth step
421 twenty-first step
422 twenty-second step
501 training process
502 basic training 503 post-training
504 reading out or generating training data
505 pre-trained neural network
506 generating further training data
507 post-trained neural network
601 third neural network
602 further rotational vector
603 regressor
604 further category label
605 classifier
606 novelty detector
607 result
701 first automation system
702 unprocessed workpiece
703 correctly processed workpiece
704 faultily processed workpiece
705 further faultily processed workpiece
706 transport system
707 direction of movement of transport system
708 tool
709 hole
710 detection device
711 first actuator
712 first collecting container
713 third optical codes
720 first control unit
722 first field bus
723 first data line
724 first network connection
800 second automation system
801 first workpiece
802 second workpiece
803 third workpiece
804 fourth optical codes
805 second actuator
806 third actuator
807 fourth actuator
808 second collecting container
809 third collecting container
810 fourth collecting container
820 second control unit
822 second field bus
823 second data line
824 second network connection

What is claimed is:

1. A method for detecting optical codes, the method comprising the following: providing an input image; detecting one or more optical codes in the input image by generating an output image on the basis of the input image; wherein within a framework of generating the output image, pixels of an area of the input image comprising a part of an optical code are assigned a first intensity in the output image; wherein within the framework of generating the output image, pixels of an area of the input image comprising no part of the optical code are assigned a second intensity in the output image; and providing regions of the output image with the first intensity for determining properties of the detected optical codes.

2. The method according to claim 1, wherein generating the output image is carried out by a first neural network, or a deep, trained, convolutional first neural network.

3. The method according to claim 2, wherein providing the input image comprises adjusting the input image; and wherein adjusting the input image is carried out in such way that the adjusted input image comprises a size compatible with a size of a first input layer of the first neural network or the deep, trained, convolutional first neural network.

4. The method according to claim 1, wherein for determining the properties of the detected optical codes, a determination of positions of detected optical codes is carried out; and wherein determining the positions of the detected optical codes is carried out by assigning enclosing rectangles, outer contours and/or geometrical centers to the regions of the output image assigned with the first intensity.

5. The method according to claim 4, wherein assigning the enclosing rectangles, outer contours and/or geometrical centers is carried out by blob detection, morphological operators and/or a binarization of the output image in combination with contour tracking.

6. The method according to claim 4, wherein determining the positions of the detected optical codes comprises transforming the enclosing rectangles, the outer contours and/or the geometrical centers to correspond to the input image.

7. The method according to claim 4, wherein for determining the properties of detected optical codes an extraction of code images is carried out on the basis of the determined positions of the detected optical codes and determining orientations and/or categories of the detected optical codes is carried out on the basis of code images.

8. The method according to claim 7, wherein determining orientations and/or categories of the detected optical codes is carried out by a second neural network, or a deep, trained, convolutional second neural network.

9. The method according to claim 8, wherein the extraction of the code images comprises adjusting the code images; and wherein adjusting the code images is carried out in such a way that the adjusted code images each comprise a size compatible with a size of a second input layer of the second neural network or the deep, trained, convolutional second neural network.

10. The method according to claim 7, wherein determining orientations and/or categories of the detected optical codes comprises extracting general features by a third neural network, or by an auto-encoder, and a regression and/or classification.

11. The method according to claim 10, wherein a characteristic of the extracted general features is examined for novelty by a novelty detector.

12. The method according to claim 1, wherein for determining the properties of the detected optical codes information stored in the detected optical codes is read out.

13. The method according to claim 1, wherein determining a property of one single optical code of the detected optical codes, determining a plurality of properties of one single optical code of the detected optical codes, determining a property of a plurality of the detected optical codes, and/or determining a plurality of properties of a plurality of the detected optical codes is carried out in parallel.

14. A non-transitory, computer readable data storage medium having computer program code stored thereon, the computer program code comprising commands that, when executing the computer program code on a computer, cause said computer to carry out a method for detecting optical codes, the method comprising: providing an input image; detecting one or more optical codes in the input image by generating an output image on the basis of the input image; wherein within a framework of generating the output image pixels of an area of the input image comprising a part of an optical code are assigned a first intensity in the output image; wherein within the framework of generating the output image pixels of an area of the input image comprising no part of the optical code are assigned a second intensity in the output image; and providing regions of the output image with the first intensity for determining properties of the detected optical codes.

* * * * *